United States Patent [19]

Valet et al.

[11] Patent Number: 5,198,498

[45] Date of Patent: Mar. 30, 1993

[54] LIGHT-STABILIZED BINDERS FOR COATING COMPOSITIONS

[75] Inventors: Andreas Valet, Eimeldingen, Fed. Rep. of Germany; Roger Meuwly, Givisiez; Mario Slongo, Tafers, both of Switzerland

[73] Assignee: Ciba-Geigy Corporation, Ardsley, N.Y.

[21] Appl. No.: 815,887

[22] Filed: Jan. 9, 1992

Related U.S. Application Data

[63] Continuation of Ser. No. 647,595, Jan. 29, 1991, abandoned.

[30] Foreign Application Priority Data

Feb. 6, 1990 [CH] Switzerland ............................ 377/90

[51] Int. Cl.$^5$ .................. C08F 8/30; C08L 33/08; C08L 33/10; C08L 61/28
[52] U.S. Cl. ..................................... 525/125; 525/199; 525/221; 525/222; 525/223; 525/157; 525/519; 525/520
[58] Field of Search ................ 525/199, 125, 221, 222, 525/223, 157, 519, 520

[56] References Cited

U.S. PATENT DOCUMENTS

| | | | |
|---|---|---|---|
| 4,314,933 | 2/1982 | Berner | 260/45.75 |
| 4,413,095 | 11/1983 | Mizuno et al. | 525/199 |
| 4,576,977 | 3/1986 | Miyazaki et al. | 523/137 |
| 4,785,063 | 11/1988 | Slongo et al. | 526/259 |
| 4,892,915 | 1/1990 | Slongo et al. | 526/259 |

FOREIGN PATENT DOCUMENTS

| | | |
|---|---|---|
| 149696 | 7/1985 | European Pat. Off. |
| 283166 | 9/1988 | European Pat. Off. |
| 2192399 | 1/1988 | United Kingdom |

OTHER PUBLICATIONS

K. Munekata, Prog. in Org. Coatings, 16, 113 (1988).
K. W. Suh, et al., J. Appl. Polym. Sci, 12, 2359 (1968).
F. Gugumus, Kunststoffe, 77, 1065 (1987).

*Primary Examiner*—James J. Seidleck
*Assistant Examiner*—W. R. H. Clark
*Attorney, Agent, or Firm*—Luther A. R. Hall

[57] ABSTRACT

The stabilized binder is a mixture of two copolymers and at least one curing agent. The one copolymer contains fluorine or silicon and a UV absorber in copolymerized form. The other copolymer is an acrylic resin. Suitalbe curing agents are melamine resins or polyisocyanates.

8 Claims, No Drawings

LIGHT-STABILIZED BINDERS FOR COATING COMPOSITIONS

This is a continuation of application Ser. No. 647,595, filed on Jan. 29, 1991, now abandoned.

The present invention relates to a mixture of two copolymers and at least one curing agent. The one copolymer contains fluorine or silicon and a UV absorber in copolymerised form. The other copolymer is an acrylic resin. The mixture can be used as binder for weather-resistant coating compositions.

Coating compositions for outdoor applications often contain acrylic resins as binders because they are relatively weather-resistant. Such binders are normally copolymers of different acrylic or methacrylic acid derivatives. Light stabilisers such as UV absorbers or sterically hindered amines or both can be added to enhance weatherability (q.v. U.S. Pat. No. 4 314 933).

Recently, fluorine-containing binders for coating compositions have been disclosed, for example copolymers of chlorotrifluoroethylene with vinyl ethers. These developments are described, for example, in Progress in Organic Coatings 16 (1988), 113-134, (q.v. also U.S. Pat. No. 4 576 977). Coating compositions based on such fluorinated resins not only have excellent weatherability, but also high gloss and dirt resistance. Their drawback is the high cost of organofluorine materials. The same applies to silicon-containing binders such as silicon resins.

It has therefore already been proposed to blend such fluorine- or silicon-containing copolymers with acrylic resins, which acrylic resins have a greater solubility in solvents than the fluorine- or silicon-containing copolymers (q.v. (GB-A-2 192 399).

It has now been found that the weatherability of such binder systems can be further appreciably enhanced by incorporating in the fluorine- or silicon-containing copolymer a UV absorber by copolymerisation.

Accordingly, the present invention relates to a composition comprising (a) a fluorine- or silicon-containing copolymer, (b) a (meth)acrylic copolymer, and (c) at least one curing agent, each of which two said copolymers contains functional groups which are able to react with the curing agent, wherein component (a) contains a UV absorber in copolymerised form.

Suitable functional groups are typically hydroxyl, carboxyl, anhydride or epoxy groups. Preferably both copolymers contain hydroxyl groups as functional groups and the curing agent is a compound which is able to react with hydroxyl groups.

Preferred compositions are those in which the solubility parameter determined by the formula of K. W. Suh and J. M. Corbett (J. Appl. Pol. Sci. 12 (1968), 2359) of component (b) as well as of component (c) is greater than that of component (a) by at least 0.5.

Copolymer (a) contains either an organofluorine component or an organosilicon component in copolymerised form.

When it contains an organofluorine component, copolymer (a) preferably comprises ($a_1$) a polyfluoroolefin,
($a_2$) at least one alkyl-and/or cycloalkylvinyl ether,
($a_3$) a hydroxyalkylvinyl ether,
($a_4$) an ethylenically unsaturated derivative of a UV absorber selected from the class of the 2-(2-hydroxyphenyl)benzotriazoles, of the o-hydroxyphenyl-s-triazines, of the o-hydroxybenzophenones or of the oxalanilides, and
($a_5$) further optional copolymerisable compounds.

Exemplary of polyfluoroolefins are 1,1-difluoroethylene, tetrafluoroethylene or hexafluoropropylene, but preferably chlorotrifluoroethylene. Preferably the copolymer (a) contains at least 30% of chlorotrifluoroethylene.

Alkylvinyl ethers are typically methylvinyl ether, ethylvinyl ether, propylvinyl ether, isopropylvinyl ether, butylvinyl ether, hexylvinyl ether or octylvinyl ether.

An illustrative example of cycloalkylvinyl ether is cyclohexylvinyl ether.

Illustrative examples of hydroxyalkylvinyl ethers are 2-hydroxypropylvinyl ether, 3-hydroxybutylvinyl ether or 4-hydroxypentylvinyl ether.

Illustrative examples of copolymerisable derivatives of 2-(2-hydroxyphenyl)benzotriazoles are the compounds of the following formulae:

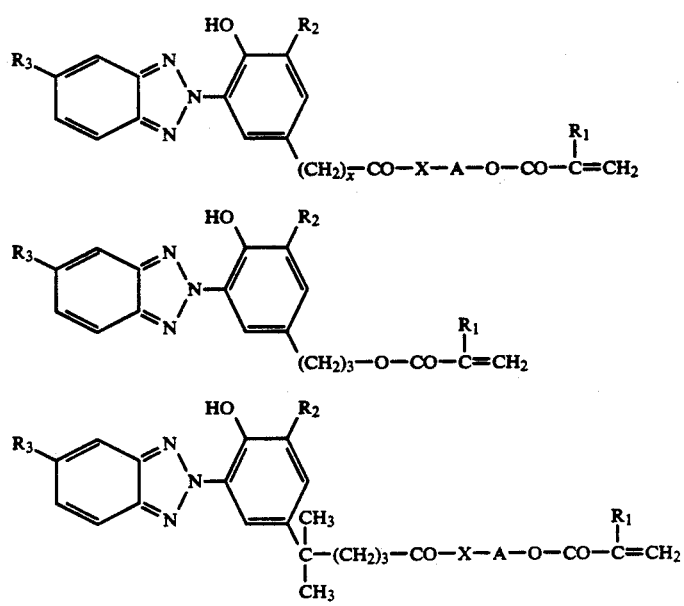

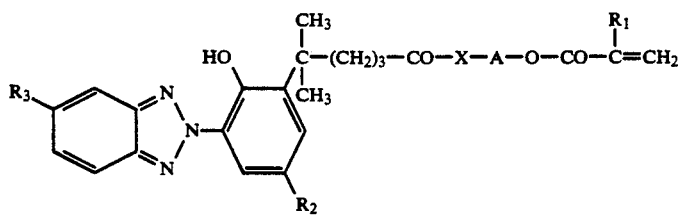
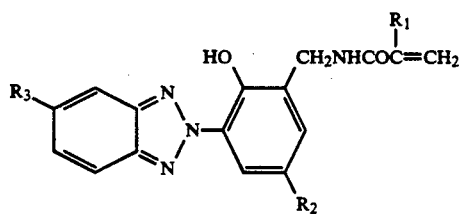
or
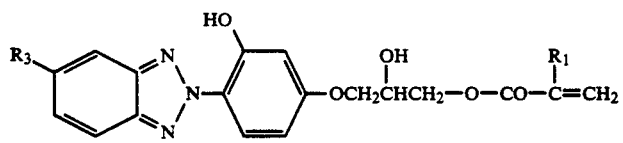
wherein x is 0–3, $R_1$ is H or $CH_3$, $R_2$ is H, Cl, $C_1$–$C_8$alkyl, $C_3$–$C_8$alkenyl or $C_3$–$C_7$aralkyl, $R_3$ is H, Cl, $C_1$–$C_4$alkyl or $C_1$–$C_4$alkoxy, X is —O— or —NH— and A is $C_2$–$C_8$alkylene, 2-hydroxytrimethylene or cyclohexylene.
Examples thereof are the compounds of the following formulae:
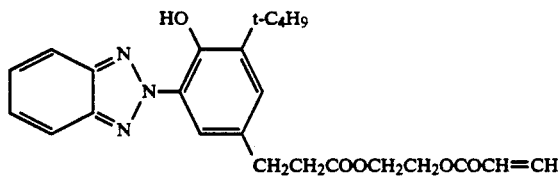
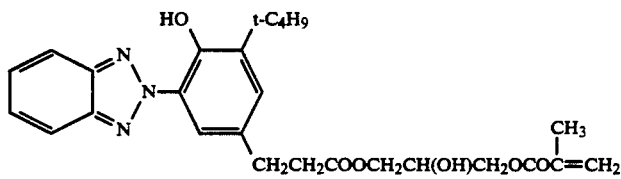
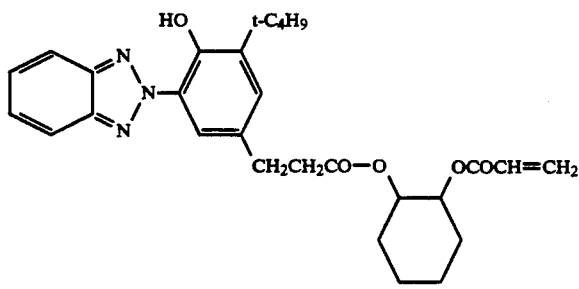
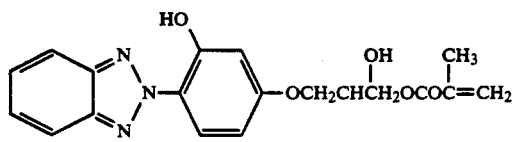

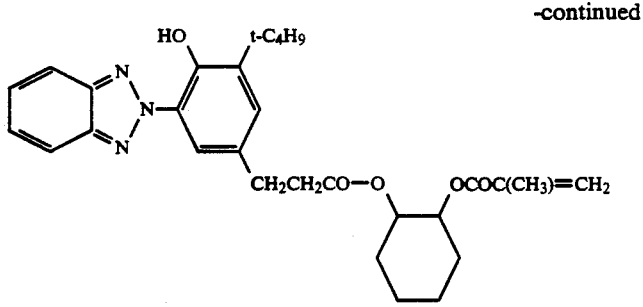

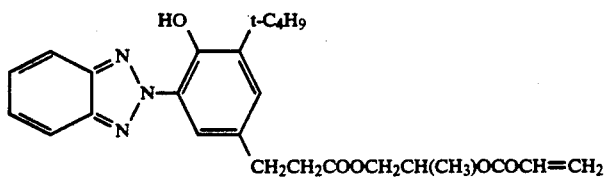

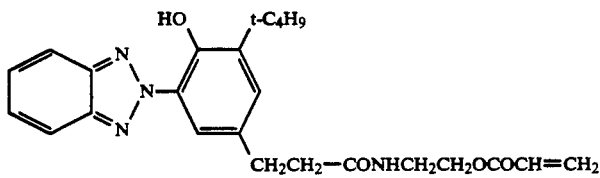

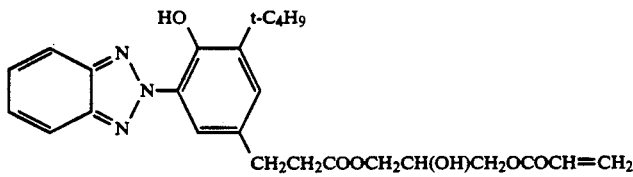

Illustrative examples of copolymerisable derivatives of o-hydroxyphenyl-s-triazines are the compounds of formula

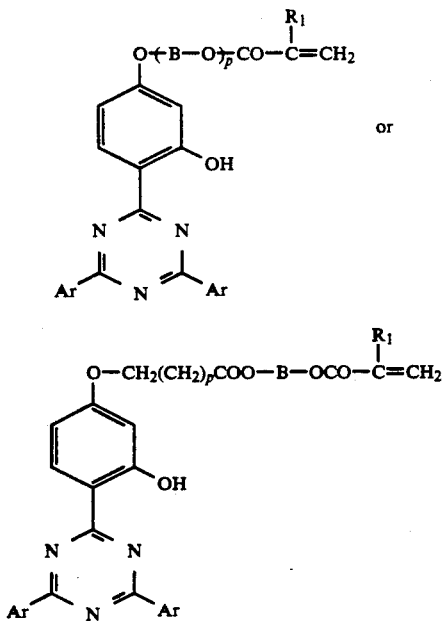

wherein p is 0 or 1, $R_1$ is H or $CH_3$, Ar is phenyl or phenyl which is substituted by $C_1$–$C_4$alkyl and/or Cl, and B is $C_2$–$C_8$alkylene, cyclohexylene or —$CH_2CH(OH)CH_2$—.

Exemplary of such compounds are:
2,4-diphenyl-6-(2-hydroxy-4-acryloyloxyethoxyphenyl)-s-triazine,
2,4-bis(2,4-dimethylphenyl)-6-(2-hydroxy-4-acryloyloxyethoxyphenyl)-s-triazine,
2,4-bis(2,4-dimethylphenyl)-6-(2-hydroxy-4-[2-hydroxy-3-methacryloyloxypropoxy]phenyl)-s-triazine,
2,4-bis(2,4-dimethylphenyl)-6-(2-hydroxy-4-methacryloyloxyphenyl)-s-triazine.

Exemplary of copolymerisable o-hydroxybenzophenones are the compounds of formula

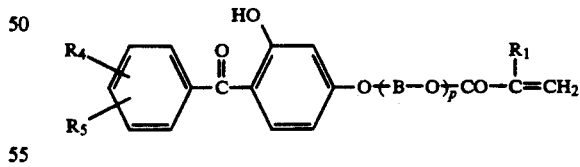

wherein p is 0 or 1, B is $C_2$–$C_8$alkylene, cyclohexylene or —$CH_2CH(OH)CH_2$—, $R_1$ is H or $CH_3$, and $R_4$ and $R_5$ are each independently of the other H, $C_1$–$C_4$alkyl, OH or $C_1$–$C_4$alkoxy.

Exemplary of such compounds are:
2-hydroxy-4-acryloyloxybenzophenone,
2-hydroxy-4-methacryloyloxybenzophenone,
2-hydroxy-4-(2-acryloyloxypropoxy)benzophenone,
2-hydroxy-4-(2-hydroxy-3-acryloyloxypropoxy)benzophenone,
2,2'-dihydroxy-4-(2-methacryloyloxyethoxy)benzophenone,
2-hydroxy-4-(2-acryloyloxyethoxy)benzophenone.

Illustrative examples of copolymerisable oxalamides are compounds of formula

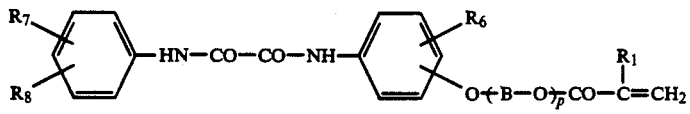

wherein p is 0 or 1, B is $C_2$–$C_8$alkylene or —$CH_2$CH(OH)$CH_2$—, $R_1$ is H or $CH_3$, and $R_6$, $R_7$ and $R_8$ are each independently of one another H, $C_1$–$C_{12}$alkyl or $C_1$–$C_{12}$alkoxy.

Exemplary of such compounds are:
N-phenyl-N'-(2-acryloyloxyphenyl)oxalamide,
N-p-tolyl-N'-(2-acryloyloxyphenyl)oxalamide,
N-p-methoxyphenyl-N'-(2-acryloyloxyphenyl)oxalamide,
N-p-methoxyphenyl-N'-[4-(2-acryloyloxyethoxy)-phenyl]oxalamide,
N-p-methoxyphenyl-N'-[2-(2-methacryloyloxypropoxy)phenyl]oxalamide,
N-phenyl-N'-[4-(2-hydroxy-3-acryloyloxypropoxy)-phenyl]oxalamide,
N-p-methoxy-N'-[2-(2-hydroxy-3-methacryloyloxypropoxy)phenyl]oxalamide,
N-o-ethylphenyl-N'-[2-(2-acryloyloxyethoxy)phenyl]oxalamide.

Preferably componente ($a_4$) is a derivative of 2-(2-hydroxyphenyl)benzotriazole or of o-hydroxyphenyl-s-triazine.

Exemplary of further copolymerisable compounds (component $a_5$) are styrene, α-methylstyrene, acrylic and methacrylic acid and the alkyl esters thereof, acrylonitrile, mono- or dialkyl maleates or maleimides. The copolymer may also contain as further copolymerisable compound ($a_5$) a copolymerisable sterically hindered amine. Illustrative examples of suitable sterically hindered amines are 2,2,6,6-tetramethylpiperidine-4-(meth)acrylate or and 1,2,2,6,6-pentamethylpiperidine-4-(meth)acrylate.

Component ($a_1$) is preferably chlorotrifluoroethylene and is preferably present in copolymer (a) in an amount of at least 30% by weight.

Preferably the fluorine-containing copolymer comprises 30–60% by weight of component ($a_1$), 20–50% of component ($a_2$), 5–20% of component ($a_3$), 0.5–10% of component ($a_4$) and 0–15% of component ($a_5$).

If the copolymer (a) contains a silicon-containing component, then (a) is preferably a copolymer of
($a_1$) an ethylenically unsaturated organosilicon compound,
($a_2$) at least one alkyl acrylate or alkyl methacrylate,
($a_3$) a hydroxyalkyl (meth)acrylate,
($a_4$) an ethylenically unsaturated derivative of a UV absorber selected from the class of the 2-(2-hydroxyphenyl)benzotriazoles, of the o-hydroxyphenyl-s-triazines, of the o-hydroxybenzophenones or of the oxalanilides, and
($a_5$) further optional copolymerisable compounds.

Exemplary of ethylenically unsaturated organosilicon compounds are vinylsilicon compounds, allylsilicon compounds or silicon-containing (meth)acrylates. As component ($a_1$) it is preferred to use a compound of formula

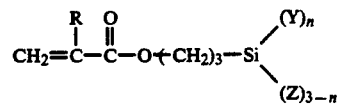

or

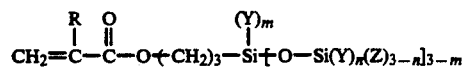

wherein n is 0–3, m is 0–3, R is H or $CH_3$, Y is $C_1$–$C_8$alkyl and Z $C_1$–$C_8$alkoxy or —$OCH_2CH_2OCH_3$. Exemplary of such compounds are:
1-[dimethyl-(3-acryloyloxypropyl)]-3-trimethyldisiloxane,
1-[dimethyl-(3-methacryloyloxypropyl)]-3-trimethyldisiloxane,
3-methacryloyloxypropyl-3-trimethoxysilane,
3-methacryloyloxypropyl-tris(trimethylsiloxy)silane.

The alkyl (methacrylates) used as component ($a_2$) preferably contain an alkyl radical of 1 to 12, more particularly 1 to 8, carbon atoms. Illustrative of such compounds are methyl (meth)acrylate, ethyl (meth)acrylate, propyl (meth)acrylate, butyl (meth)acrylate, hexyl (meth)acrylate, octyl (meth)acrylate, decyl (meth)acrylate or dodecyl (meth)acrylate.

The hydroxyalkyl (meth)acrylates used as component ($a_3$) preferably contain a hydroxyalkyl radical of 2 to 6 carbons atoms. Illustrative of such compounds are 2-hydroxyethyl (meth)acrylate, 2-hydroxypropyl (meth)acrylate, 2-hydroxybutyl (meth)acrylate or 2-hydroxyhexyl (meth)acrylate As UV absorber component ($a_4$) it is possible to use the same compounds as for the fluorine-containing compounds cited hereinbefore. Here too the derivatives of 2-(2-hydroxyphenyl)benzotriazole and of o-hydroxyphenyl-s-triazine are preferred.

As further copolymerisable compounds (component $a_5$) it is possible to use typically styrene, α-methylstyrene, acrylic acid, methacrylic acid, acrylonitrile or esters of maleic acid. The copolymer also may contain as further copolymerisable compound ($a_5$) a copolymerisable sterically hindered amine. Illustrative examples of suitable sterically hindered amines are 2,2,6,6-tetramethylpiperidine-4-(meth)acrylate and 1,2,2,6,6-pentamethylpiperidine-4-(meth)acrylate.

The silicon-containing copolymer (a) will preferably comprise 5–40% of component ($a_1$), 30–70% of component ($a_2$), 5–20% of component ($a_3$), 0.5–10% of component ($a_4$) and 0–30% of component ($a_5$).

Component (b) is a (meth)acrylic copolymer customarily used as binder for coating compositions. These copolymers are also called acrylic resins. They consist mainly of one or more alkyl acrylates or alkyl methacrylates and contain a minor amount of a functional acrylate or methacrylate. The (meth)acrylic polymer thus contains functional groups which are able to react, with crosslinking, with a suitable curing agent.

A great number of such acrylic resins are commercially available. It is preferred to use an acrylic resin which is a copolymer of several alkyl acrylates or alkyl methacrylates, a hydroxyalkyl (meth)acrylate and acrylic or methacrylic acid.

Component (c) is a curing agent which is able to react with the functional groups of components (a) and (b). It is preferred to use as curing agent a melamine resin or a polyisocyanate or a mixture of both.

The melamine resins suitable for use as curing agents are preferably N-hydroxymethyl and N-alkoxymethyl derivatives of melamine. Such melamine derivatives suitable for use as curing agents are commercially available and are conventionally used for curing acrylic resins.

Suitable polyisocyanate curing agents are preferably diisocyanates and triisocyanates such as toluene diisocyanate, diphenylmethane-4,4'-diisocyanate, hexamethylene diisocyanate or isophorone diisocyanate, and the dimerised, trimerised or capped derivatives thereof.

The ratio of (a) to (b) may vary within a wide range. Preferably the weight ratio of (a):(b) is 20:80 to 80:20. The amount of curing agent (c) depends on the number of functional groups in (a) and (b). It is preferred to use 3 to 80 parts by weight of curing agent per 100 parts of (a) and (b). In a preferred embodiment of the invention, the novel mixture comprises 30–50% by weight of (a), 30–50% by weight of (b) and 10–25% by weight of (c).

The novel compositions can be used as binders for weather-resistant coating compositions. In the simplest case, the coating compositions contain a mixture of the invention and a solvent. The coating compositions may be clear or pigmented compositions. Suitable pigments may be inorganic, organic or metallic pigments. The viscosity of the coating compositions can be regulated by adding solvents or thickeners. The coating compositions may contain further modifiers such as fillers, plasticisers, levelling agents, adhesion promoters, accelerators, antioxidants or light stabilisers. The addition of light stabilisers selected from the class of the sterically hindered amines is of particular importance, as, together with the incorporated UV absorber of the binder, these compounds are able to effect a synergistic enhancement of weatherability. Illustrative examples of preferred sterically hindered amines are the derivatives of 2,2,6,6-tetramethylpiperidine described in Kunststoffe 77 (1987) 1065–69 or in EP-A-156 52 on pages 5–17.

Depending on the curing agent used, these coating compositions can be cured at room temperature or at elevated temperature. In each case, curing is accelerated by heating (stoving). Acceleration can also be effected by adding curing catalysts. Thus, for example, curing with isocyanates can be accelerated by organotin compounds or by basic catalysts (for example tertiary amines). Curing with melamine resins can be accelerated by acid catalysts, for example by addition of toluenesulfonic acid.

The cured coating compositions are distinguished not only by excellent weathering resistance, but also by high gloss. Suitable substrates can be the customary ones, such as metal, wood, ceramic materials or plastics materials. If multilayer coats are applied, the coating compositions containing the binders of this invention are preferably used as topcoats, as they screen against UV radiation. The invention likewise relates to the cured finishes obtained with the novel coating compositions.

The following Examples illustrate the invention in detail. Parts and percentages are by weight.

EXAMPLES

Example 1

Preparation of a fluorine-containing copolymer

In a 400 ml autoclave fitted with stirrer, 25.24 g of cyclohexylvinyl ether, 14.42 g of ethylvinyl ether, 11.61 g of hydroxybutylvinyl ether and 5.73 g of UV absorber UV-1

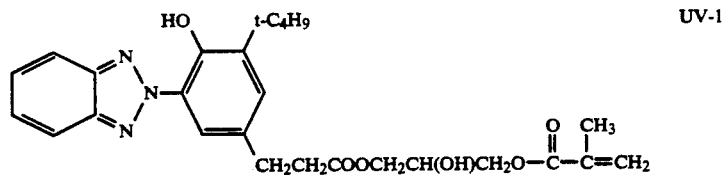

are dissolved, under nitrogen, in 110 g of tert-butanol, and 2 g of $K_2CO_3$ and 0.1 g of azoisobutyronitrile are added. To remove released air, the solution is solidified by cooling with liquid nitrogen. After warming to room temperature, 58.24 g of chlorotrifluoroethylene are added, the autoclave is closed and heated slowly, with stirring, to 65° C. This temperature is kept for 7 hours and then cooled to room temperature. The solid copolymer is precipitated by pouring the resultant solution into water. It is washed with water and dried. The limiting viscosity $[\eta]$ of the copolymer is 0.30 dl/g. Elemental analysis shows that the copolymer contains 5% of UV absorber.

EXAMPLE 2

Example 1 is repeated, using as UV absorber 5.73 g of the compound UV-2

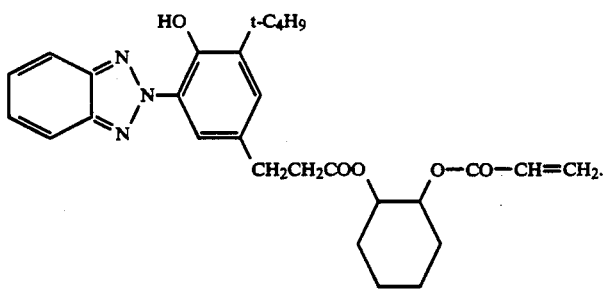

The copolymer obtained contains 5% of UV absorber.

EXAMPLE 3

Example 1 is repeated, using as UV absorber 5.73 g of the compound UV-3

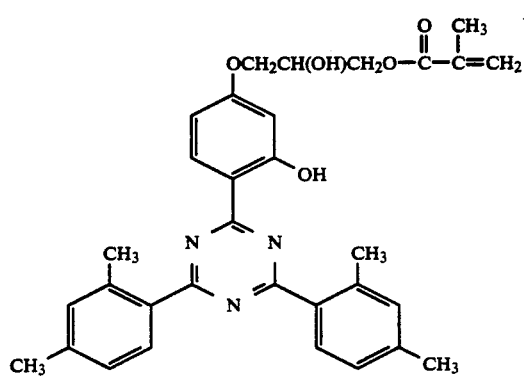

The copolymer obtained contains 5% of UV absorber.

EXAMPLE 4

Example 1 is repeated, using as UV absorber 5.73 g of the compound UV-5

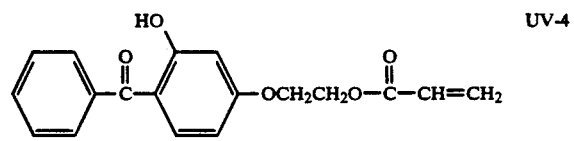

The copolymer obtained contains 5% of UV absorber.

Example 5

Example 1 is repeated, using as UV absorber 5.73 g of the compound UV-5

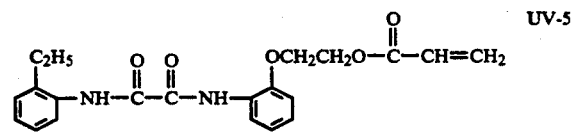

The copolymer obtained contains 5% of UV absorber.

EXAMPLE 6

Preparation of a silicon-containing copolymer

A mixture of 90 g of xylene and 10 g of 4-methyl-2-pentanone is heated to 105° C. At this temperature, a mixture of 10 g of 3-methacryloyloxypropylpentamethyl disiloxane, 16.9 g of styrene, 7.3 g of methyl methacrylate, 46.5 g of 2-ethylhexyl methacrylate, 16.2 g of 2-hydroxyethyl methacrylate, 3.1 g of methacrylic acid, 5.2 g of UV absorber UV-1 and 0.7 g of azoisobutyronitrile is added dropwise over 4 hours. The mixture is then stirred for 2 hours at the same temperature, to give a ca. 50% solution of the copolymer. The copolymer contains 5% of UV absorber in copolymerised form.

EXAMPLE 7

Example 6 is repeated, using 5.2 g of compound UV-3 as UV absorber. The copolymer obtained contains 5% of UV absorber.

EXAMPLE 8

Example 6 is repeated, using 5.2 g of compound UV-4 as UV absorber. The copolymer obtained contains 5% of UV absorber.

EXAMPLE 9

Example 6 is repeated, using 5.2 g of compound UV-5 as UV absorber. The copolymer obtained contains 5% of UV absorber.

EXAMPLE 10

Preparation of clear coating compositions with melamine curing agent

Mixtures are prepared from 19.5 parts of a copolymer which contains fluorine and UV absorber (product of Example 1), 19.5 parts of an acrylic resin (copolymer of 31% of ethyl acrylate, 29.5% of methyl methacrylate, 20.2% of 2-ethylhexyl methacrylate, 16.2% of 2-hydroxyethyl methacrylate and 3.1% of methacrylic acid, and 9.8 parts of a melamine resin (Cymel ® 1130, Cyanamid Corp.) as curing agent. The mixtures contain ca. 2% of UV absorber, based on solids. They are then diluted with xylene to sprayable consistency and applied to aluminium sheets coated with a silver metallic primer lacquer. The test pieces are stored for 15 minutes at room temperature and then stoved for 30 minutes at 130° C. The finish so obtained has a film thickness of 40–45 μm.

A clear coating composition the fluorine-containing copolymer of which was prepared as described in Example 1, but without UV absorber, as well as the same formulation to which 2% (based on solids) of UV-1 has been added, is used for comparison purposes. The formulation of the coating composition and the coating of the test pieces are as described above.

The cured test pieces are subjected to accelerated weathering in a UVCON ® Weather-O-Meter (with UVB-313 lamps) and in a xenon Weather-O-Meter (CAM 159, KFA method). The 60° gloss according to DIN 67 530 is measured as the criterion for assessing damage.

TABLE 1

UVCON Weathering
(8 h exposure at 70° C./4 h condensation at 50° C.)

| Stabiliser | 60° gloss (in %) after | | | |
|---|---|---|---|---|
| | 0 | 400 | 1200 | 1600 h |
| without | 87 | 40 | 15 | — |
| 2% of UV-1 incorporated (copolymer of Ex. 1) | 94 | 84 | 54 | 37 |
| 2% of UV-1 added | 87 | 64 | 25 | 20 |

TABLE 2

| | Xenon Weather-O-Meter |
|---|---|
| Stabiliser | 60° gloss (%) after 800 h |
| without | 18 |
| 2% of UV-1 incorporated (copolymer of Ex. 1) | 49 |
| 2% of UV-1 added | 18 |

EXAMPLE 11

Example 10 is repeated, using 19.5 parts of the copolymer of Example 3 in place of the copolymer of Example 1. The clear coating composition contains ca. 2% of UV-3, based on solids.

The test pieces are coated as described in Example 10 and tested in a CAM 159 xenon Weather-O-Meter and by measuring the 60° gloss in accordance with DIN 67 530.

TABLE 3

| | Xenon Weather-O-Meter |
|---|---|
| Stabiliser | 60° gloss (%) after 800 h |
| without | 18 |
| 2% of UV-3 incorporated (copolymer of Ex. 3) | 42 |
| 2% of UV-3 added | 19 |

EXAMPLE 12

Mixtures are prepared from 19.5 parts of the silicon-containing copolymer of Example 6, 19.5 parts of the acrylic resin used in Example 10, and 9.8 parts of melamine resin (Cymel® 1130) as curing agent. The mixtures contain ca. 2% of UV absorber, based on solids.

A mixture prepared by using a silicon-containing copolymer which does not contain UV absorber as comonomer, but which has otherwise been prepared as described in Example 6, is used for comparison purposes.

The test pieces are coated and tested as described in Example 10. The results are reported in Table 4.

TABLE 4

| | Weathering in a xenon Weather-O-Meter |
|---|---|
| Stabiliser | 60° gloss (%) after 2000 h |
| without | 40 |
| 2% of UV-1 incorporated (copolymer of Ex. 6) | 52 |
| 2% of UV-3 incorporated (copolymer of Ex. 7) | 60 |

EXAMPLE 13

Clear coating composition with isocyanate curing agent

Mixtures are prepared from 19.5 parts of the fluorine-containing copolymer of Examples 1 and 3, 19.5 parts of the acrylic resin described in Example 10, and 5.2 parts of an aliphatic triisocyanate (Desmodur® N 75, Bayer A.G.). The mixtures contain ca. 2.2% of UV absorber, based on solids.

The mixtures are diluted with xylene to sprayable consistency and applied to aluminium sheets coated with a silver metallic primer lacquer. The test pieces are air-dried for 15 minutes at room temperature and then cured for 45 minutes at 80° C. The finish so obtained has a film thickness of 40-45 μm.

A coating composition the fluorine-containing copolymer of which has been prepared as described in Example 1, but without UV absorber as comonomer, is used for comparison purposes. Further, to this formulation is added once 2.2% of UV-1 and once 2.2% of UV-3. The results obtained after subjecting the test pieces to weathering for 1200 hours in the UVCON Weather-O-Meter (8 h exposure at 70° C., 4 h condensation at 50° C.) are reported in Table 5.

TABLE 5

| | Weathering in UVCON Weather-O-Meter |
|---|---|
| Stabiliser | 60° gloss (%) after 1200 h |
| without | 9 |
| 2.2% of UV-1 incorporated (copolymer of Ex. 1) | 78 |
| 2.2% of UV-1 added | 46 |
| 2.2% of UV-3 incorporated (copolymer of Ex. 3) | 63 |
| 2.2% of UV-3 added | 16 |

EXAMPLE 14

A mixture is prepared from 19.5 parts of the silicon-containing copolymer of Example 7, 19.5 parts of the acrylic resin used in Example 10, and 5.2 parts of Desmodur® N75. The mixture contains ca. 2.2% of UV-3 in copolymerised form.

In the same manner, a mixture is prepared whose silicon-containing copolymer has been prepared as described in Example 7, but without UV absorber as comonomer. This mixture is used once without and once with addition of 2.2% of UV-3 (based on solids). The coating of the test pieces and testing in the UVCON Weather-O-Meter (8 h exposure at 70° C., 4 h condensation at 50° C.) are as described in Example 13. The results are reported in Table 6.

TABLE 6

| | Weathering in UVCON Weather-O-Meter |
|---|---|
| Stabiliser | 60° gloss (%) after 2000 h |
| without | 22 (cracking) |
| 2.2% of UV-3 incorporated (copolymer of Ex. 7) | 47 |
| 2.2% of UV-3 added | 24 |

What is claimed is:

1. A curable composition comprising
   (a) a fluorine-containing copolymer,
   (b) a (meth)acrylic copolymer, and
   (c) at least one curing agent, each of which two said copolymers contains functional groups which are able to react with the curing agent,
   wherein only component (a) contains a UV absorber which is a derivative of 2-(2-hydroxyphenyl)benzotriazole or of o-hydroxyphenyl-s-triazine in copolymerised form.

2. A composition according to claim 1, wherein the copolymers (a) and (b) contain hydroxyl groups and the curing agent is a compound which is able to react with hydroxyl groups.

3. A composition according to claim 1, wherein component (a) is a copolymer of
  ($a_1$) a polyfluoroolefin,
  ($a_2$) at least one alkyl- or cycloalkylvinyl ether,
  ($a_3$) a hydroxyalkylvinyl ether,
  ($a_4$) an ethylenically unsaturated derivative of a UV absorber selected from the 2-(2-hydroxyphenyl)-benzotriazoles, or the o-hydroxyphenyl-s-triazines, and
  ($a_5$) further optional copolymerisable compounds.

4. A composition according to claim 3, wherein component ($a_1$) is chlorotrifluoroethylene and is present in the copolymer (a) in an amount of at least 30% by weight.

5. A composition according to claim 1, wherein component (b) is a copolymer of at least two monomers chosen from the list consisting of alkyl (meth)acrylate, hydroxyalkyl (meth)acrylate or (meth)acrylic acid.

6. A composition according to claim 1, wherein component (c) is a melamine resin, or a polyisocyanate or mixture thereof.

7. A composition according to claim 1, wherein the weight ratio of (a) to (b) is 20:80 to 80:20, and the weight ratio of (c) to the sum of (a) and (b) is 3–80 to 100.

8. A composition according to claim 1, wherein the copolymer (a) contains a sterically hindered amine in copolymerised form.

* * * * *